UNITED STATES PATENT OFFICE.

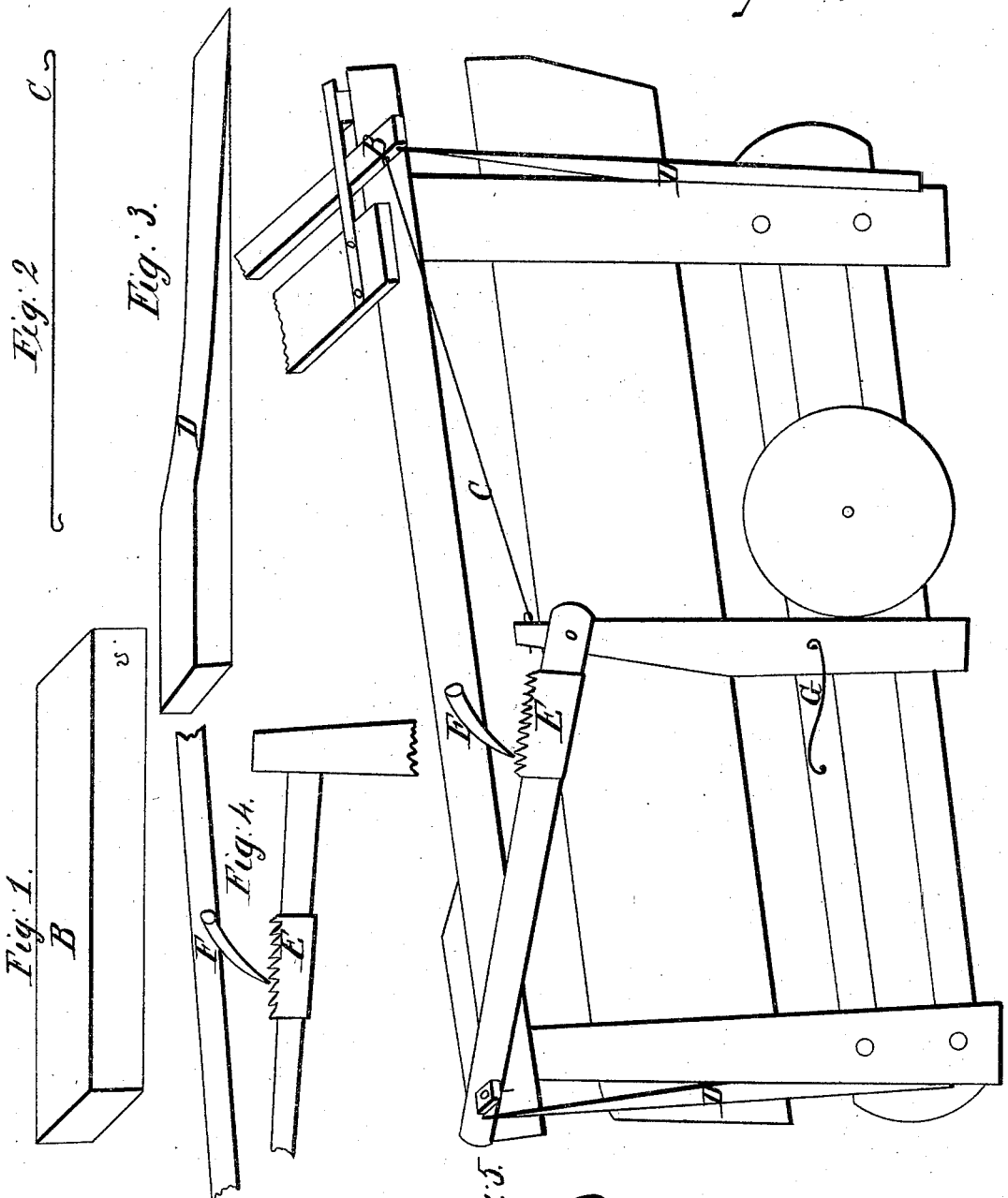

JAMES CURRAN, OF KIRKWOOD, NEW YORK.

APPLICATION OF BRAKES TO DRIVING-WHEELS OF TREAD-POWERS.

Specification of Letters Patent No. 33,134, dated August 27, 1861.

*To all whom it may concern:*

Be it known that I, JAMES CURRAN, of Kirkwood, in the county of Broome and State of New York, have invented a new and useful Machine or Apparatus for the Instant Application of Brakes to the Driving-Wheel of Tread-Powers; and I do hereby declare that the following is a full, clear, and exact description of the construction and operation of my invention.

The apparatus consists of (5) five principal parts which are to be attached to tread-powers as now constructed and used.

The first principal part is a cross beam B (Figure 1) to extend across the machine to which it is applied and about 4 inches from each side thereof. This cross beam is to be adjusted across the tread-power in front of the animal supplying the power and is to be attached on one side of the tread-power in a mortise or slit by means of a bolt, the other end being movable in a similar slit or mortise for the space of about 8 inches. To this cross-beam the animal or animals employed are to be fastened by their breast-straps. The movable end of said cross-beam is also to be attached by means of an iron eye to the bar now described as the second principal part of said apparatus.

The second principal part is a ½ inch or ⅝ inch iron rod C (Fig. 2) which is attached by means of an iron-eye to the inner side of the movable end of the cross-beam B (Fig. 1) as it projects beyond the side of the tread power, and the said rod must be of sufficient length to extend to the upper end of the brake (as now in use on tread-powers) to which upper end said rod is attached by another iron-eye about 6 in. long with a thread cut upon it and supplied with two nuts, so that the rod can be lengthened or shortened at pleasure. Then when force is applied by the animal to the cross-bar B (Fig. 1) it is at once communicated to the brake and the machine stopped. The rod O (Fig. 2) may be of wood if desired or even a rope.

The third principal part D (Fig. 3) is a wooden spring fixed at its lower extremity to the long post of the tread-power and extending upward so far that the upper end presses against the inner side of the movable end of the cross-beam B (Fig. 1) keeping it fixed at 6 or 8 inches forward of the posts of the tread-power machine and thereby keeping the brake from off the driving wheel when the machine is in operation.

The fourth principal part is a cast-iron comb E (Fig. 4) about 4 inches long attached to the tongue of the brake as now in use, to be applied to which a cast-iron dog or hand F (Fig. 4) about 10 inches long 1½ in. wide and about an inch thick is to be fastened by a screw or bolt to the side of the tread-power.

The fifth principal part is a common iron hammer-strap about 6 inches long G (Fig. 5) one end to be attached to the bolt of the common brake now in use and the other end to be attached to the side of the tread-power. The use of this hammer-strap is to straighten and steady the brake.

This apparatus instantly applies the brake to the driving wheel of the tread-power machine when the band flies off and thus prevents the strain and damage to the horse or other animal which now so frequently happens, its application being effected by the motion of the animal when the band flies off the driving wheel.

As thus herein described and specified my invention is to be attached to the forepart of the tread-power and in front of the horse or horses driving the same and when so applied the horse or horses are to be attached to the cross beam B (Fig. 1). Another application of my invention can be made by simply attaching the apparatus to the rear-end of the tread-power instead of front exactly in the same manner with two exceptions which I now state and specify. 1st. The end of the tongue of the brake now in use will be then attached to the movable end of the cross beam B (Fig. 1) by means of a mortise and bolt. 2r. The upper end of the wooden spring D (Fig. 3) will then press against the outer (instead of inner side of the movable end of the cross beam B (Fig. 1) in which case the animal driving the machine may be loose.

What I claim as my invention is—

The apparatus the principal parts of which are hereinbefore described and the application thereof to the front and rear of tread-powers and the security given to the brake by the hammer strap G (Fig. 5).

Dated 19th January A. D. 1861.

JAMES CURRAN.

Witnesses:
  FRANK LOOMIS,
  B. N. LOOMIS.